United States Patent [19]

Miyazaki et al.

[11] Patent Number: 4,650,223
[45] Date of Patent: Mar. 17, 1987

[54] HOSE JOINT

[75] Inventors: Takeshi Miyazaki, Inazawa; Kenji Sugiyama, Gifu, both of Japan

[73] Assignee: Toyoda Gosei Co., Ltd., Nishikasugai, Japan

[21] Appl. No.: 647,015

[22] Filed: Sep. 4, 1984

[30] Foreign Application Priority Data

Sep. 5, 1983 [JP] Japan .................. 58-163009

[51] Int. Cl.⁴ .......................................... F16L 33/20
[52] U.S. Cl. .................. 285/158; 285/174; 285/256
[58] Field of Search ........... 285/256, 250, 174, 334.5, 285/259, 158

[56] References Cited

U.S. PATENT DOCUMENTS

| | | | |
|---|---|---|---|
| 1,725,286 | 8/1929 | Loughead | 285/259 X |
| 1,944,890 | 1/1934 | Heidloff | 285/259 X |
| 2,299,160 | 10/1942 | MacPherson | 285/259 X |
| 2,489,890 | 11/1949 | Hufferd | 285/256 |
| 2,496,037 | 1/1950 | Courtot | 285/256 |
| 2,517,669 | 8/1950 | Hufferd et al. | 285/256 |
| 2,562,116 | 7/1951 | Nelson | . |
| 2,584,948 | 2/1952 | Weatherhead, Jr. | 285/256 X |
| 2,992,020 | 7/1961 | Gulick | 285/256 X |
| 3,345,090 | 10/1967 | Weatherhead, Jr. et al. | 285/256 |
| 3,525,542 | 8/1970 | Belart et al. | 285/256 |
| 3,549,180 | 12/1970 | MacWilliam | 285/256 |
| 3,833,246 | 9/1974 | Wake | 285/259 X |

FOREIGN PATENT DOCUMENTS 1092737 11/1960 Fed. Rep. of Germany ...... 285/256
2143607  2/1985 United Kingdom .

Primary Examiner—Thomas F. Callaghan
Attorney, Agent, or Firm—Cushman, Darby & Cushman

[57] ABSTRACT

Herein disclosed is a hose joint which comprises an outer tube having a threaded portion at one side of a flanged portion and a sleeved portion at the other side, and an inner tube arranged in the outer tube and having a nipple portion positioned in the sleeved portion and a tapered sealing portion for providing communication between the nipple portion and the threaded portion of the outer tube and for acting for a mating member to be jointed to the hose joint. Both the outer tube and the inner tube are made of a tubular material such that at least the flanged portion of the outer tube and the sealing portion of the inner tube are plastically deformed.

4 Claims, 8 Drawing Figures

PRIOR ART

HOSE JOINT

BACKGROUND OF THE INVENTION

1. Field of the Invention

The present invention relates to a hose joint which is used such that it is mounted on an end portion of a hose when the hose is to be jointed to a mating member.

2. Description of the Prior Art

A hose joint 1 of the above-specified kind according to the prior art is formed, as shown in FIG. 1, with a threaded portion 3 at one side of a flanged portion 2, a sleeved portion at the other side, and a nipple portion 5 in the sleeved portion 4. The nipple portion 5 has its rear end communicating with the threaded portion 3 through a conduit portion 5a and a sealing portion 5b. The hose joint 1 thus constructed is produced of a rod material by the cold forging or cutting work.

As a result, since the hose joint 1 of the prior art has its individual portions made of one rod material, a working load required for the cold forging work is usually about 70 tons to make it impossible to avoid rise in the cost for facilities. In the case of the cutting work, on the other hand, many portions have to be cut to deteriorate the production yield and elongate the period for the work. In either case, the production cost is raised.

SUMMARY OF THE INVENTION

A first object of the present invention is to provide a hose joint which has an excellent yield and a low working load to drop the cost for facilities so that the production cost can be reduced.

A second object of the present invention is to provide a hose joint which has its strength improved.

A third object of the present invention is to provide a hose joint which can have its nipple portion made of a material having a higher corrosion resistance than a sleeved portion.

A fourth object of the present invention is to provide a hose joint which can have its nipple portion worked to improve sealing properties when it is jointed to a hose.

The above-specified objects can be achieved by providing a hose joint which comprises an outer tube having a threaded portion at one side of a flanged portion and a sleeved portion and a sleeved portion at the other side, and an inner tube arranged in the outer tube and having a nipple portion positioned in the sleeved portion and a tapered sealing portion for providing communication between the nipple portion and the threaded portion of the outer tube and for acting for a mating member to be jointed to the hose joint, and in which both the outer tube and the inner tube are made of a tubular material such that at least the flanged portion of the former and the sealing portion of the latter are plastically deformed.

DESCRIPTION OF THE PREFERRED EMBODIMENTS

Figure 1:
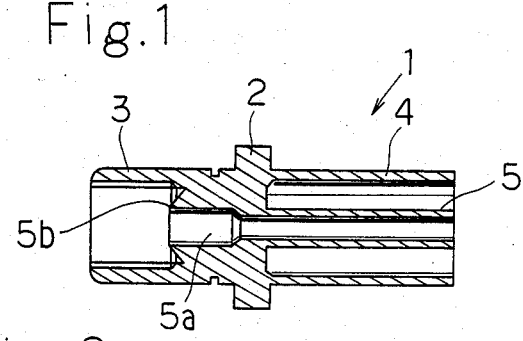
FIG. 1 is a sectional view showing a hose joint according to the prior art.
Figure 2:
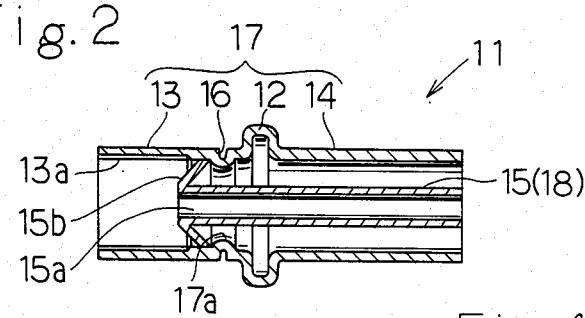
FIG. 2 is a sectional view showing a hose joint according to a first embodiment of the present invention.

A hose joint 11 according to a first embodiment, as shown in FIG. 2, is composed of two members, i.e., an outer tube 17 which can be mounted on a hose, and an inner tube 18 which is arranged in the outer tube 17 and can be mounted in the hose. The outer tube 17 and the inner tube 18 are formed, respectively, of tubular materials which are made of either a metallic material such as steel, bronze or aluminum or a nonmetallic material such as a synthetic resin or a synthetic resin reinforced by glass fibers.

Figure 3:
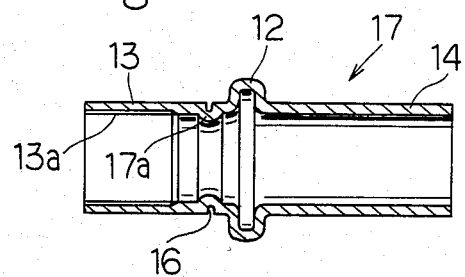
FIG. 3 is a sectional view showing an outer tube of the hose joint of the first embodiment.
Figure 4:
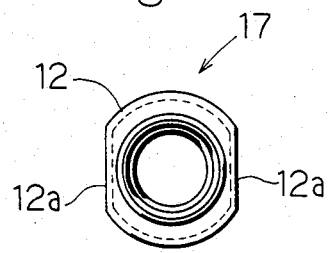
FIG. 4 is a side elevation showing the outer tube of the hose joint of the first embodiment.

Moreover, the outer tube 17 is formed with a flanged portion 12 by elastically deforming the tubular material by bulging it. One side of that flanged portion 12 is formed with a female thread 13a to provide a threaded portion 13, and the other side of the same flanged portion 12 provides a sleeved portion 14. Considering that the hose joint 11 is attached, when used, to a mounting fixture, the outer tube 17 of the embodiment is formed with a grooved portion 16, delimited by flanges 16a, 16b, into which is inserted a fixing clip acting so that the hose joint 11 may be inserted into a mounting hole of a mounting fixture to bring its flanged portion into abutment against the peripheral edge of the mounting hole and so that the grooved portion 16 may clamp the peripheral edge of the mounting hole together with the flanged portion 12. Indicated at reference character 17a is a land (i.e. a radial constriction) which is formed on the inner circumference of the outer tube when the grooved portion 16 is formed. Moreover, the outer tube 17 of the embodiment has its flanged portion 12 formed with flat faces 12a and 12a of different radial extent than the remainder of the round periphery, at the sides of its outer circumference simultaneously with the bulging of that portion so that the flat faces 12a may be fitted in the mounting hole of the mounting fixture to function to prevent any turning of the hose when the hose joint 11 is mounted in the mounting hole (as shown in FIGS. 3 and 4).

Figure 5:
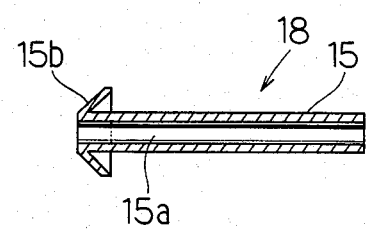
FIG. 5 is a sectional view showing an inner tube of the hose joint of the first embodiment.

The inner tube 18 is formed with a sealing portion 15b by flaring one end of the tubular material to provide a nipple portion 15, which is positioned in the sleeved portion 14 of the outer tube 17. The inner tube 18 is at its other end left unflared and a conduit portion 15a (i.e. squeeze-formed, e.g. crimped) between the sealing portion 15b and the nipple portion 15. Incidentally, the sealing portion 15b is so tapered that its leading end can abut against the land 17a of the outer tube 17 and that it can seal a mating member which is to be jointed to the threaded portion 13 of the hose joint 11 (as shown in FIG. 5).

Figure 6:
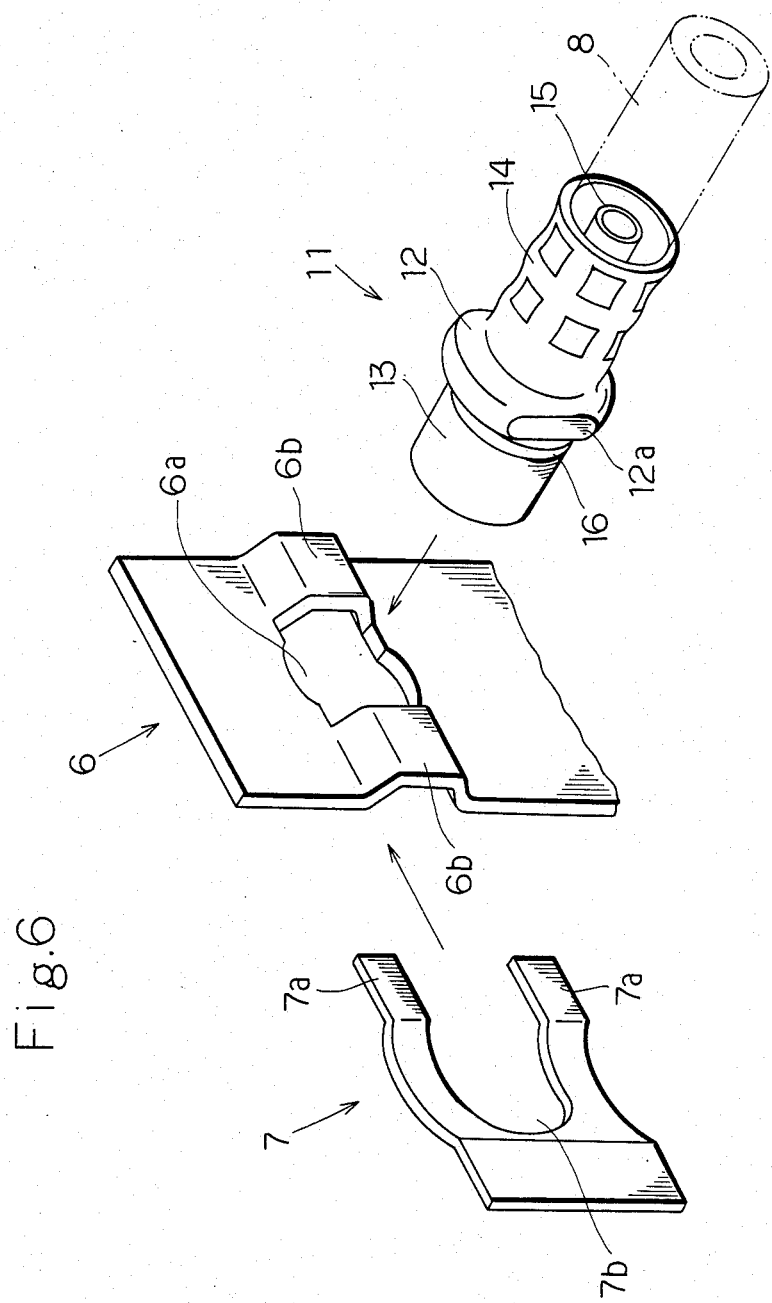
FIG. 6 is a perspective view showing the mode of using the hose joint of the first embodiment.
Figure 7:
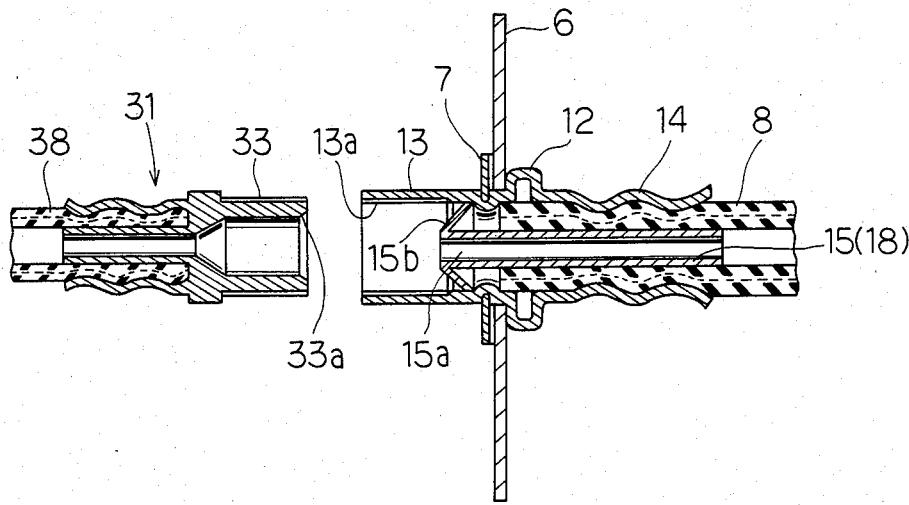
FIG. 7 is a sectional view showing the mode of using the hose joint of the first embodiment.

Next, the mode of using the hose joint 11 thus constructed will be described in the following (as shown in FIGS. 2, 6 and 7). A hose 8 is mounted on the nipple portion 15 of the inner tube 18, and the sleeved portion 14 of the outer tube 17 is caulked to fasten the hose 8 to the hose joint 11.

After that, the hose joint 11 is inserted into a mounting hole 6a of a mounting fixture 6. Incidentally, this mounting hole 6a of the mounting fixture 6 is sized to abut against the flanged portion 12 of the hose joint 11 and is formed at its peripheral edge with bulged portions 6b and 6b which can have their side end faces abutting against the flat faces 12a of the flanged portion 12.

Moreover, the hose joint 11 is inserted into the mounting hole 6a of the mounting fixture 6 to bring its flanged portion 12 into abutment against the peripheral edge of the mounting hole 6a and the flat faces 12a of its flanged portion 12 into abutment against the end faces of the bulged portions 6b and 6b, and a fixing clip 7 is fitted in the grooved portion 16 thereby to mount the hose joint 11 in the mounting fixture 6. That fixing clip 7 is formed with two tongues 7a and 7a which define a U-shaped notch 7b and which are bulged and have the space between them sized so that they can be fitted in the grooved portion 16 of the hose joint 11. When fitted in this grooved portion 16, the tongues 7a clamp the peripheral edge of the mounting hole 6a of the mounting fixture 6 together with the flanged portion 12 thereby to prevent the hose joint 11 from coming out of the mounting fixture 6.

After that, the hose joint 11 is used by threading as a mating member, a hose joint 31, in which a hose 38 is fixed and which is formed with a threaded portion 33 having a male thread, into the threaded portion 13. At this time, the threaded portion 33 is formed in the inner circumference of its leading end with a tapered sealing portion 33a which comes into abutment into the sealing portion 15b of the inner tube 18 to perform its sealing function.

The assembly of the outer tube 17 and the inner tube 18 may be conducted either by soldering or welding them while the sealing portion 15b of the latter tube 18 has its leading end abutting against the land 17a of the former tube 17 or by pressing or caulking (i.e. squeeze-forming) the inner tube 18 in position.

Without resorting to welding, caulking (i.e. squeeze-forming) or pressing work, moreover, the inner tube 18 can be arranged in a predetermined position in the outer tube 17, if the former tube 18 is inserted into the latter tube 17 so that the hose 8 is fastened to the hose joint 11 by the use of a jig for holding the inner tube 18. In case the inner tube 18 is thus arranged in the outer tube 17, its sealing portion 15b is not completely fixed in the inner circumference of the outer tube 17 so that it has excellent draping properties with the hose joint acting as the mating member to be jointed to the threaded portion 13 of the hose joint 11, whereby it can be displaced or plastically deformed in a manner to correspond to the sealing portion 33a of the mating member thereby to improve the sealing properties.

As a result, the hose joint 11 of the first embodiment is composed of the two members, i.e., the outer tube 17 and the inner tube 18 which are made of the tubular materials, respectively, such that the outer tube 17 has its flanged portion 12 and grooved portion 16 and so on formed by bulging or rolling work whereas the inner tube 18 has its sealing portion 15b formed by flaring work and such that the outer tube 17 and the inner tube 18 have their individual portions formed by plastically deforming the tubular materials. Thus, the hose joint 11 can have an excellent production yield and a low working load, e.g., about 3 tons, to reduce the cost for the facilities thereby to drop the production cost. Since the individual portions of the outer tube 17 and the inner tube 18 are formed by the plastic deformation. Moreover, the flows of the materials are established along the contour of the hose joint 11 to improve the strength of the same. Since the hose joint 11 itself is composed of the two members, i.e., the outer tube 17 and the inner tube 18, the latter tube 18 can be made of a material having a high corrosion resistance to improve the degree of freedom of selecting the materials.

Figure 8:
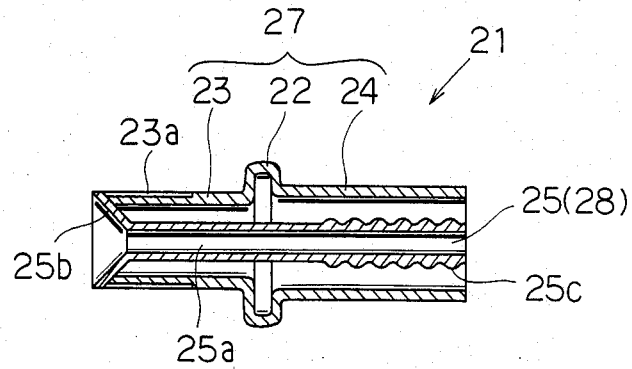
FIG. 8 is a sectional view showing a hose joint according to a second embodiment of the present invention.

FIG. 8 shows a hose joint 21 according to a second embodiment of the present invention. This hose joint 21 is composed of two members, which are made of materials similar to those of the first embodiment, namely, an outer tube 27 and an inner tube 28 which is arranged in the former tube 27.

This outer tube 27 is plastically deformed by bulging a tubular material to form a flanged portion 22 which has its one side formed with a male thread 23a by a rolling process or the like to provide a threaded portion 23, its other side providing a sleeved portion 24. That flanged portion 22 has its circumference formed into a hexagonal shape so as to facilitate the work of threading that hose joint 21 into its mating member.

The inner tube 28 is formed with a sealing portion 25b by flaring one end of a tubular member and with lands 25c by rolling the other end to provide a nipple portion having an improved rigidity and a conduit portion 25a between the sealing portion 25b and the nipple portion 25. The sealing portion 25b is so tapered as to have its leading end abutting against the leading end of the threaded portion 23 of the outer tube 27 and to effect a sealing function for a mating member to be jointed to the threaded portion 23 of the hose joint 21.

The assembly of the outer tube 27 and the inner tube 28 is similar to that of the hose joint 11 of the first embodiment and is effected by placing a hose on the nipple portion 25 to caulk (i.e. squeeze-form) the sleeved portion 24 and by fastening the hose to that hose joint 21 so that the hose joint 21 is used like the hose joint 31, for example, as shown in FIG. 7.

The resultant effects obtainable from the hose joint 21 of the second embodiment are similar to those of the hose joint 11 of the first embodiment and are that the undulations such as the lands 25c can be easily formed on the nipple portion 25 to improve the sealing properties of the hose joining portions. In addition to that, the material for the inner tube 28 can be selected to have a high corrosion resistance.

What is claimed is:
1. In a combined hose joint and mount,
for joining an end of a length of hose to another conduit means and mounting that end of the length of hose to a mounting fixture which includes a plate having an opening provided therethrough, this opening having a generally rounded bounding peripheral surface provided with two substantially angularly spaced, angularly short segments of substantially different radial extent than that of the remainder of said generally rounded peripheral surface, this plate being generally planar, but being bulged in one direction about an axis which extends generally parallel to a face of the plate in such a manner that both of said two substantially angularly spaced, angularly short segments of said peripheral surface of said opening are substantially axially displaced from the plane of the remainder of said plate, in which the combined hose joint and mount includes:

a tubular member adapted to be mounted to a length of hose in surrounding relation to an axially short region at an end of the length of hose, in order to permit the length of hose, at that region, to be mounted to another structure;

a first radially outwardly projecting flange integrally provided on said tubular member;

a second radially projecting flange fixed on said tubular member axially adjacent said first flange; and a third radially projecting flange fixed on said tubular member with axial spacing from said second flange so as to define between said second and third flanges a radially outwardly opening groove adapted to received a spring clip;

said first radially outwardly projecting flange being defined in part by generally rounded, radially outer peripheral surface means, these radially outer peripheral surface means including at two substantially angularly spaced sites respective angularly short segments of substantially different radial extent than that of the remainder of said outer peripheral surface means;

said first flange, including said two angularly short segments thereof, being sized and shaped to coact with said mounting fixture, as follows:

if the tubular member is inserted, third flange first, into a said opening of a said mounting fixture, angularly aligned and axially advanced until portions of the first flange abut a respective one face of said mounting fixture marginally of said opening, (a) portions of said second flange within the plane of said remainder of said plate of said mounting fixture are radially closely surrounded by respective portions of said peripheral surface of said opening;

(b) said two angularly short segments of said first flange are radially closely surrounded by respective of said two angularly short segments of said peripheral surface of said opening in said bulge so as to prevent angular rotation of said hose holder relative to said mounting fixture; and (c) said radially outwardly opening groove is positioned to receive a spring clip to act between said third flange and the respective opposite face of said plate of said mounting fixture for preventing substantial relative axial movement between said hose holder and said mounting fixture, the improvement wherein:

said tubular member axially to the opposite side of said third flange from said first flange is provided with a band of threading which is adapted to permit a conduit connector to be threadedly joined to said tubular member;

said tubular member axially to the opposite side of said first flange from said third flange is provided with a sleeve which is adapted to closely circumferentially surround said axially short region of said length of hose;

a second tubular member, separate from the first-described said tubular member;

said second tubular member having a tubular nipple portion adapted to be telescopically fitted into said axially short region of said length of hose, to extend out of said end of said length of hose, and to be generally coaxially spacedly surrounded by said first-described tubular member radially inwardly of said sleeve and said radially outwardly opening groove;

said second tubular member further having a flared sealing annulus formed thereon so as to extend radially outwardly from said tubular nipple portion at a site located axially to the opposite side of said third flange from said second flange of said first-described tubular member, this flared sealing annulus being adapted to circumferentially seal with a corresponding surface of a conduit connector when such conduit connector is threadedly joined to said first-described tubular member by said band of threading; and cooperatively engageable surface means on said flared sealing annulus and on said first-described tubular member, these surface means being adapted to engage for fixing said second tubular member with respect to said first-described tubular member against axial movement of said surface means of said flared sealing annulus beyond said surface means of said first-described tubular member in the direction towards said first flange.

2. The improved combined hose joint and mount of claim 1, wherein:

said radially outwardly opening groove exists as a circumferential indentation in said first-described tubular member, said indentation protruding internally of this tubular member as a local constriction in diameter, this local constriction engaging said surface means of said flared sealing annulus for providing said surface means of said first-described tubular member.

3. The improved combined hose joint and mount of claim 1, further including:

a length of hose having an axially short region including an end thereof telescopically generally coaxially received between said sleeve of said first-described tubular member and said tubular nipple portion of said second tubular member; and means securing said axially short region of said length of hose onto said tubular nipple portion.

4. The improved combined hose joint and mount of claim 3, wherein:

said securing means comprises crimps in said sleeve of said first-described tubular member, these crimps squeezing said axially short region of said length of hose against said tubular nipple portion of said second tubular member.

* * * * *